United States Patent
Lee et al.

(10) Patent No.: US 9,085,691 B2
(45) Date of Patent: Jul. 21, 2015

(54) BINDER COMPOSITION, ELECTRODE FOR RECHARGEABLE BATTERY EMPLOYING THE SAME AND MANUFACTURING METHOD THEREOF

(75) Inventors: Beomwook Lee, Yongin-si (KR); Hyesun Jeong, Yongin-si (KR); Hyeran Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 262 days.

(21) Appl. No.: 13/568,059

(22) Filed: Aug. 6, 2012

(65) Prior Publication Data

US 2013/0266857 A1 Oct. 10, 2013

(30) Foreign Application Priority Data

Apr. 10, 2012 (KR) .................. 10-2012-0037462

(51) Int. Cl.
*C08L 71/00* (2006.01)
*H01M 4/04* (2006.01)
*H01M 4/13* (2010.01)
*H01M 4/139* (2010.01)
*H01M 4/62* (2006.01)
*C09D 177/10* (2006.01)
*C08G 69/32* (2006.01)
*C08G 69/42* (2006.01)
*C08G 73/10* (2006.01)
*H01M 4/134* (2010.01)

(52) U.S. Cl.
CPC .............. *C08L 71/00* (2013.01); *C08G 69/32* (2013.01); *C08G 69/42* (2013.01); *C08G 73/105* (2013.01); *C08G 73/1067* (2013.01); *C08G 73/1071* (2013.01); *C09D 177/10* (2013.01); *H01M 4/0471* (2013.01); *H01M 4/13* (2013.01); *H01M 4/139* (2013.01); *H01M 4/622* (2013.01); *C08G 2650/40* (2013.01); *H01M 4/134* (2013.01); *Y02E 60/122* (2013.01)

(58) Field of Classification Search
None
See application file for complete search history.

(56) References Cited

U.S. PATENT DOCUMENTS

| 2008/0045615 | A1* | 2/2008 | Best et al. ................. 521/27 |
| 2008/0311479 | A1* | 12/2008 | Lee et al. ................. 429/232 |
| 2010/0323242 | A1 | 12/2010 | Choi et al. |
| 2011/0003202 | A1* | 1/2011 | Wakizaka et al. ........... 429/209 |
| 2011/0171526 | A1 | 7/2011 | Wakizaka et al. |

FOREIGN PATENT DOCUMENTS

| JP | 2010-272492 A | 12/2010 |
| KR | 10-2010-0104020 A | 9/2010 |
| KR | 10-2011-0060900 A | 6/2011 |

OTHER PUBLICATIONS

Machine English Transltion of JP 2010-272492 A, 45 pages.

* cited by examiner

*Primary Examiner* — Patrick Ryan
*Assistant Examiner* — Wyatt McConnell
(74) *Attorney, Agent, or Firm* — Christie, Parker & Hale, LLP

(57) ABSTRACT

A binder composition has good tensile strength, and can improve the cycle life of a rechargeable battery by maintaining the conduction path of an electrode even during expansion or shrinkage of the active material. The binder composition is environmentally friendly, and can be used in existing production lines as-is. An electrode and a rechargeable battery use the binder composition. The binder composition for a rechargeable battery includes a main binder including a poly (p-phenylene terephthalamide) having at least one of a sulfonic acid group ($-SO_3H$) or a sulfonate group ($-SO_3^-M^+$) in the polymer main chain.

12 Claims, 2 Drawing Sheets

BINDER COMPOSITION, ELECTRODE FOR RECHARGEABLE BATTERY EMPLOYING THE SAME AND MANUFACTURING METHOD THEREOF

CROSS-REFERENCE TO RELATED APPLICATION

This application claims priority to and the benefit of Korean Patent Application No. 10-2012-0037462 filed on Apr. 10, 2012, the entire content of which is incorporated herein by reference.

BACKGROUND

1. Technical Field

Aspects of the present invention relate to a binder composition, an electrode for a rechargeable battery employing the same and a manufacturing method thereof.

2. Description of the Related Art

The development of light-weight, compact, high-performance portable electronic devices has led to a corresponding increase in the demand for high capacity, long-life rechargeable batteries. To satisfy this demand and improve the capacity, cycle life and stability characteristics of the rechargeable batteries, research is actively being conducted into the materials of the rechargeable batteries other than the positive and negative electrode materials, such as electrolyte, separator or binder materials.

Among other materials, as is known in the art, pure aramid compounds have strong hydrogen bonding, thereby imparting good thermal stability and high tensile strength. However, if the hydrogen bonding is impeded during synthesis of the aramid compound, the aramid properties may not be achieved.

Therefore, solutions of pure aramid compounds (i.e., compounds obtained after precipitation and purification to acquire the pure aramid compounds) have been proposed. However, the pure aramid compounds prepared by purification are insoluble in nearly all solvents, except sulfuric acid solutions.

In addition, binders soluble in organic solvents have been proposed. However, these solutions are not environmentally friendly. Also, in order to use a binder soluble in an organic solvent, the aqueous-based process currently used in existing negative electrode production lines must be adapted.

SUMMARY

Aspects of the present invention are directed to a binder composition having good fibrous tensile strength, and is therefore capable of improving the cycle life of a rechargeable battery by maintaining the conductive path of an electrode even during expansion or shrinkage of the active materials.

Aspects of the present invention are further directed to an electrode for a rechargeable battery employing the binder composition, to a rechargeable battery including the same, and to a method of manufacturing the same. The electrode and battery have good thermal stability and cycle life characteristics.

According to aspects of the present invention, a binder composition for a rechargeable battery includes a main binder including poly(p-phenylene terephthalamide) having at least one of a sulfonic acid group ($-SO_3H$) or a sulfonate group ($-SO_3^-M^+$) in the polymer main chain.

According to aspects of the present invention, an electrode for a rechargeable battery includes an electrode current collector, an electrode active material and a binder. The main binder includes the substituents of the poly(p-phenylene terephthalamide), i.e., the sulfonic acid group(s) ($-SO_3H$) and/or the sulfonate group(s) ($-SO_3^-M^+$) in an amount of 10% or less of the main binder.

According to aspects of the present invention, the binder is prepared using the binder composition.

According to aspects of the present invention, a method of manufacturing an electrode for a rechargeable battery (the electrode including the main binder of poly(p-phenylene terephthalamide) represented by Formula 1) includes: preparing a binder composition including a main binder including poly(p-phenylene terephthalamide) having at least one of a sulfonic acid group ($-SO_3H$) or a sulfonate group ($-SO_3^-M^+$) in the polymer main chain; preparing an electrode active material slurry by mixing the binder composition and the electrode active material; forming an electrode active material layer by coating the electrode active material slurry on the current collector; evaporating a solvent by performing a first heat-treatment on the electrode active material layer; and preparing poly(p-phenylene terephthalamide) represented by Formula 1 by removing the sulfonic acid group ($-SO_3H$) or the sulfonate group ($-SO_3^-M^+$) by performing a second heat-treatment on the electrode active material layer under vacuum.

Formula 1

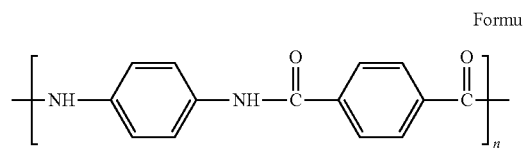

In Formula 1, n ranges from 10 to 1000.

In the binder composition according to embodiments of the present invention, poly(p-phenylene terephthalamide) can be used as the binder without losing the aramid properties, thereby maintaining good binding force between the current collector and the active material, and high tensile strength. Therefore, even when the active material expands or shrinks, electrode deformation may be substantially prevented or eliminated, and the cycle life of the rechargeable battery can be improved.

In addition, since the binder composition is water soluble, it is environmentally friendly, and it can be employed in current negative electrode production lines as-is without needing to change the aqueous system based process.

Additional aspects and/or advantages of the invention will be set forth in part in the description which follows, and in part will be obvious from the description or may be learned by practice of the invention.

DETAILED DESCRIPTION OF THE INVENTION

Figure 1:
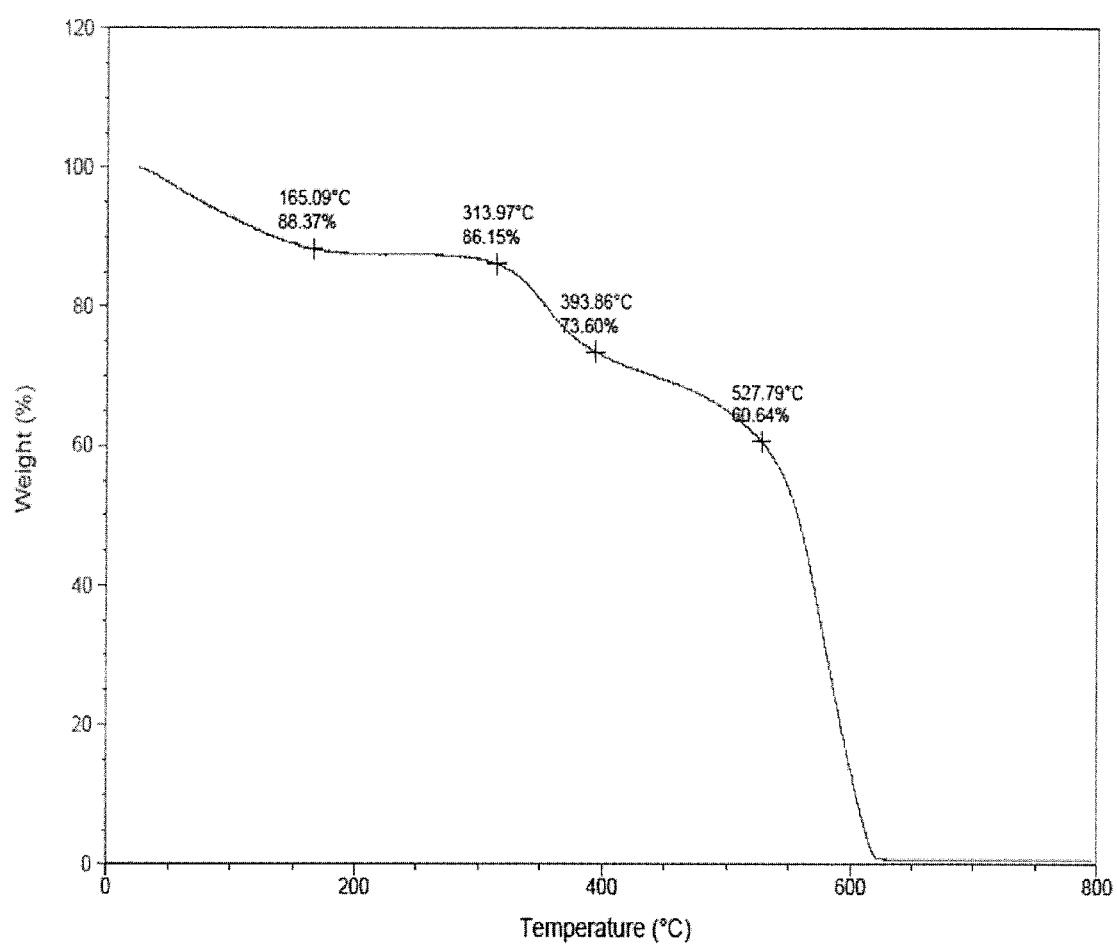
FIG. 1 is a graph of the thermogravimetric analysis (TGA) results of the binder represented by Formula 5 prepared according to an embodiment of the present invention.

An electrode according to embodiments of the present invention includes poly(p-phenylene terephthalamide) represented by Formula 1. Poly(p-phenylene terephthalamide) compounds (represented by Formula 1) are polymers having high tensile strengths, and have been used in the fabrication of bulletproof vests and combat helmets. However, currently, the only solvent capable of dissolving poly(p-phenylene terephthalamide) compounds represented by Formula 1 is a sulfuric acid solution. Accordingly, it has been difficult to use poly(p-phenylene terephthalamide) compounds (represented by Formula 1) to other fields.

To solve these problems, embodiments of the present invention provide a binder composition of an electrode including a compound represented by Formula 1 that is prepared by dissolving a poly(p-phenylene terephthalamide) having at least one of a sulfonic acid group ($-SO_3H$) or a sulfonate group ($-SO_3^-M^+$) in the polymer main chain (hereinafter referred to as a "substituted poly(p-phenylene terephthalamide)") in water or an organic solvent; preparing a slurry for forming an electrode using the substituted poly(p-phenylene terephthalamide) dissolved in the water or organic solvent; and causing a reaction to remove the sulfonic acid group ($-SO_3H$) and/or the sulfonate group ($-SO_3^-M^+$) in the polymer main chain (namely, desulfonication and/or desulfonation at 250 to 450° C. during vacuum drying).

In the desulfonication and/or desulfonation, it is desirable to completely remove the sulfonic acid group and/or sulfonate group during vacuum drying. However, since the main binder retains its properties even when the substituents are included in an amount of 10% or less in the main polymer, it is not necessary to completely remove the sulfonic acid group and/or sulfonate group.

Binder Composition
Main Binder

According to one embodiment, a binder composition for a rechargeable battery includes a poly(p-phenylene terephthalamide) comprising a substituted poly(p-phenylene terephthalamide) having at least one substituent as a main binder.

The substituted poly(p-phenylene terephthalamide) may be used alone or in combination with other materials. In addition, two or more materials having the same structure but different molecular weights may be used in combination as the main binder.

The main binder is soluble in water or an organic solvent due to the sulfonic acid group ($-SO_3H$) and/or sulfonate group ($-SO_3^-M^+$) substituents in the main chain of the aromatic poly(p-phenylene terephthalamide).

According to one embodiment, the sulfonic acid group(s) ($-SO_3H$) and/or sulfonate group(s) ($-SO_3^-M^+$) in the main binder are directly attached to an aromatic ring of the poly(p-phenylene terephthalamide).

According to one embodiment, the main binder becomes poly(p-phenylene terephthalamide) represented by Formula 1 (not having substituents attached thereto) by desulfonication and/or desulfonation occurring during vacuum drying (VD), which is one of the electrode formation processes:

Formula 1

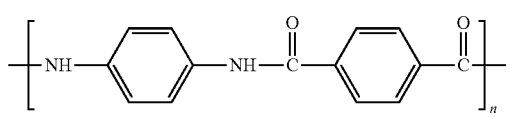

In Formula 1, n represents repeating units of the polymer and has a value of 10 to 1000, for example 50 to 200.

According to an embodiment of the present invention, the main binder is prepared by polymerization of diamine and dicarboxylic acid, or diamine and dicarboxyl acid chloride.

The diamine may be at least one selected from compounds (a) to (c) of Formula 2.

Formula 2

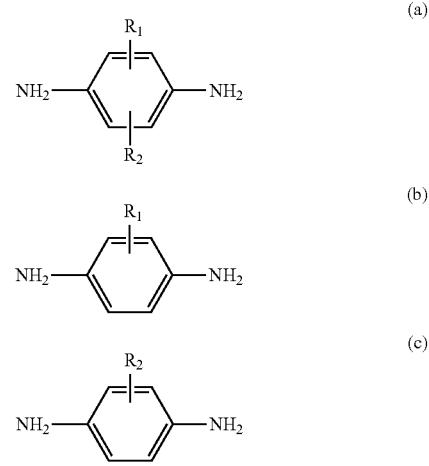

The dicarboxylic acid compound may be at least one selected from compounds (a) to (c) of Formula 3.

Formula 3

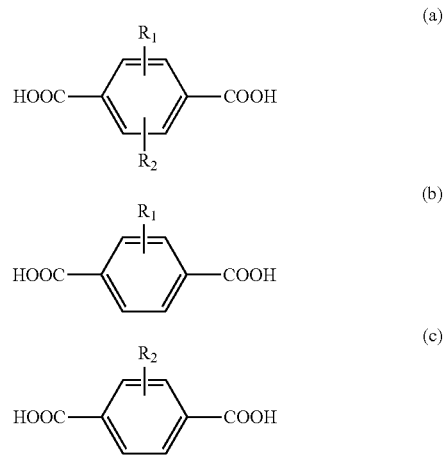

The dicarboxylic acid salt may be at least one selected from compounds (a) to (c) of Formula 4.

Formula 4

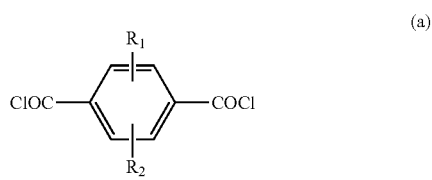

-continued

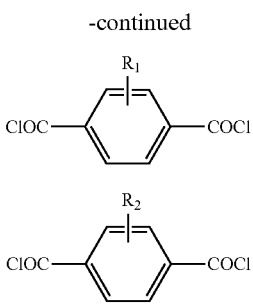

In Formulas 2 to 4, $R_1$ and $R_2$ are each independently selected from H, $SO_3H$, and $SO_3^-M$. M is an alkali metal such as lithium (Li), sodium (Na) or potassium (K); an alkali earth metal such as magnesium (Mg) or calcium (Ca); or a primary, secondary or tertiary amine compound such as ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, or triethanolamine.

Subsidiary Binder

The main binder (as a binder for forming the electrode according to embodiments of the present invention) may be used alone or in combination with other binder materials for improving dispersibility of the active material and conductive agent, improving adherence between the active material and the current collector, and/or improving elasticity.

When water is used as the solvent of the main binder, the subsidiary binder (i.e., a binder used in combination with the main binder) may be a binder that is soluble in water or dispersed in water.

However, since desulfonication and/or desulfonation in the main binder should occur at 250 to 450° C. during vacuum drying, the subsidiary binder may be a binder that is not pyrolyzed even at 450° C.

Nonlimiting examples of subsidiary binders having good pyrolysis properties include poly(aryl ether ketones), poly (aryl amides) (i.e., aramids), aromatic polyamic acids, aromatic polyimides, aromatic poly(amide-imides), aromatic polyurethanes, aromatic polyesters (i.e., polyarylates), polybenzimidazoles, polybenzoxazoles, polybenzothiazoles, aromatic polysulfones, aromatic poly(ether sulfones), aromatic poly(phenylene sulfides), aromatic polyphosphazenes, combinations thereof and modifications thereof. Examples of modifications of the above listed polymers may include polymers substituted with fluoride, polymer having one or more sulfone groups (—$SO_2$—) in their main chains, or block copolymers of different polymers (attached in the form of a block).

In embodiments of the present invention, the main binder and the subsidiary binder may be used in combination, and the main binder may be present in an amount of 5 to 100 wt %, for example 10 to 90 wt %, based on the total weight of the binder. If the amount of the main binder is less than 5 wt %, the desired properties of binder may be weakened.

Other Additives

In order to improve additional characteristics, the binder composition for forming the electrode according to embodiments of the present invention may include additional additives. Nonlimiting examples of the additives include dispersants, thickeners, conductive agents and fillers.

The respective additives may be mixed with the binder composition in advance, and then the mixture may be used to prepare the slurry for forming the electrode. Alternatively, the respective additives may be separately prepared, and then independently used.

The kinds and amounts of the additives to be used may be determined according to the active material and binder used. In some cases, the additives may not be used.

The amount of each of the additives may vary according to the kind of active material, the components of binder, and the kind of additive. In some embodiments, the additives may be present in an amount of 0.1 to 10 wt % relative to the weight of the binder composition, excluding the solvent. If the amount of the additive is less than 0.1 wt %, the effect of the addition of the additive is not high enough. If the amount of the additive exceeds 10 wt %, the proportion of the main binder based on the amount of the binder composition for forming a negative electrode is reduced, so that the desired characteristics may not be attained.

The dispersant may be selected from materials capable of improving the dispersibility of the positive or negative active material and conductive agent in the slurry. The dispersant may be selected from cationic, anionic, or nonionic dispersants. Nonlimiting examples of the dispersant include hydrocarbons having 5-20 carbon atoms in the lipophilic portion, acryl oligomers, ethylene oxide oligomers, propylene oxide oligomers, ethylene oxide and propylene oxide oligomers, urethane oligomers, and combinations thereof.

The thickener facilitates coating of the slurry on the current collector when the slurry has low viscosity. Nonlimiting examples of the thickener include carboxymethyl cellulose, carboxyethyl cellulose, ethyl cellulose, hydroxymethyl cellulose, hydroxyethyl cellulose, hydroxypropyl cellulose, polyvinylalcohol, and combinations thereof.

However, the dispersant and the thickener may be mostly pyrolyzed (and therefore removed) at a vacuum drying temperature of 250° C. to 450° C. Thus, the dispersant and the thickener are used in small amounts only when necessary.

The conductive agent is a component for improving the conduction path of an electrode and is used to impart conductivity to the conductive agent. Any electronically conductive material can be used as the conductive agent so long as it does not cause a chemical change in the battery. Nonlimiting examples the conductive agent include natural graphite, artificial graphite, carbon nanofiber, carbon black, acetylene black, ketjen, copper, nickel, aluminum or silver metal powders, and combinations thereof.

The filler is an auxiliary component for suppressing electrode expansion by improving the strength of the binder. Nonlimiting examples of the filler include fibrous materials, such as glass fibers, carbon fibers, metal fibers, and combinations thereof.

Solvent

Water is, in principle, used as the solvent of the binder composition. In some embodiments, however, the solvent may be selected from N,N-dimethylformamide, N,N-dimethylacetamide, methylethylketone, cyclohexanone, ethyl acetate, butyl acetate, cellusolve acetate, propyleneglycol monomethylether acetate, methylcellusolve, butylcellusolve, methylcarbitol, butylcarbitol, propyleneglycol monomethylether, diethyleneglycol, dimethylether, toluene, xylene, and combinations thereof.

The content of the solvent is not particularly restricted as long as the solvent can appropriately adjust the viscosity of the slurry.

Preparation of Electrode

Preparation of Electrode Active Material Slurry

An electrode active material slurry may be prepared by mixing the binder composition for an electrode according to embodiments of the present invention with an electrode active material. The binder composition includes the combination of components discussed above.

When the electrode is a negative electrode, crystalline carbon, amorphous carbon or a combination thereof may be used as the active material.

Nonlimiting examples of the crystalline carbon include amorphous, plate-type, flake-type, globular, and fibrous natural and artificial graphite. Nonlimiting examples of the amorphous carbon include soft carbon (e.g., carbon sintered at low temperatures), hard carbon (e.g., carbon sintered at high temperatures), mesophase pitch carbide, and sintered cokes. In some embodiments, the negative active material may be selected from Si, SiOx (where 0<x<2), Sn, $SnO_2$, Si containing metal alloys, and mixtures thereof. Nonlimiting examples of metals capable of forming Si alloys include Al, Sn, Ag, Fe, Bi, Mg, Zn, in, Ge, Pb, Ti, and combinations thereof.

When the electrode is a positive electrode, a lithiated intercalation compound capable of reversibly intercalating and deintercalating lithium may be used as the active material. Specific examples of the lithiated intercalation compound include lithium cobalt oxide ($LiCoO_2$); lithium nickel oxide ($LiNiO_2$); lithium manganese oxides, such as compounds of the formula $Li_{1+x}Mn_{2-x}O_4$ (where $0 \leq x \leq 0.33$), $LiMnO_3$, $LiMn_2O_3$ and $LiMnO_2$—; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxides, such as $V_2O_5$; Ni-site type lithiated nickel oxides of the formula $LiNi_{1-x}M_xO_2$ (where M may be Co, Mn, Al, Cu, Fe, Mg, B or Ga, and $0.01 \leq x \leq 0.3$); lithium manganese composite oxides of the formula $LiMn_{2-x}M_xO_2$ (where M may be Co, Ni, Fe, Cr, Zn or Ta, and $0.01 \leq x \leq 0.1$), or the formula $Li_2Mn_3MO_8$ (where M may be Fe, Co, Ni, Cu or Zn); $LiMn_2O_4$ wherein a portion of the Li is substituted with one or more alkaline earth metals; disulfide compounds; and iron molybdenum oxide ($Fe_2(MoO_4)_3$), etc., and combinations thereof.

The binder composition according to embodiments of the present invention (and/or other general binders) may be used as the binder for a positive electrode. The general binders may serve to efficiently adhere the positive active material particles to one another or to efficiently adhere the positive active material to the current collector. Nonlimiting examples of the general binders include polymers including polyvinyl alcohol, carboxymethylcellulose, hydroxypropylcellulose, diacetylcellulose, polyvinylchloride, carboxylated polyvinylchloride, polyvinylfluoride, and ethylene oxide; polyvinyl pyrollidone, polyurethane, polytetrafluoroethylene, polyvinylidene fluoride, polyethylene, polypropylene, styrene butadiene rubber, acrylated styrene butadiene rubber, epoxy resin, and nylon.

Preparation of Electrode Active Material Layer

The slurry prepared using the binder composition and active material is coated on a current collector, heated and dried under vacuum to form an electrode active material layer.

The slurry may be coated by screen printing, spray coating, coating using a doctor blade, gravure coating, deep coating, silk screening, painting, or coating using a slot die, according to the viscosity of the slurry.

The current collector is generally fabricated to have a thickness of 3 to 100 μm. There is no particular limit to the current collector, so long as it has suitable conductivity and does not cause a chemical change in the fabricated battery. Nonlimiting examples of the current collector include copper, stainless steel, aluminum, nickel, titanium, sintered carbon, copper or stainless steel having a surface treated with carbon, nickel, titanium or silver, and aluminum-cadmium alloys. In addition, the current collector may be processed to have fine irregularities on the surface so as to enhance adhesive strength to the electrode active material. In addition, the current collector may take various forms including films, sheets, foils, nets, porous structures, foams and non-woven fabrics.

Preparation of Electrode

The slurry coated on the current collector is then dried. To accomplish drying, a first heat treatment is performed at a temperature of 80 to 120° C. to evaporate the solvent (i.e., water or organic solvent) in the composition for forming the negative active material layer.

If the temperature of the first heat treatment is lower than 80° C., it is difficult to remove the solvent (e.g., water) from the electrode, which is not desirable. If the temperature of the first heat treatment is higher than 120° C., the solvent (e.g., water) is evaporated too rapidly, which may generate bubbles on the surface of the electrode and reduce uniformity of the electrode surface. The drying may be performed in an atmospheric environment.

After the solvent in the composition coated on the current collector is evaporated by the first heat treatment, a second heat treatment is performed under vacuum. The second heat treatment may be performed at a temperature of 250 to 450° C. under a vacuum pressure of $1 \times 10^-$ to $1 \times 10^{-6}$ torr to thereby cause desulfonication and/or desulfonation to remove the substituents from the poly(p-phenylene terephthalamide).

The thus prepared electrode for a rechargeable battery includes poly(p-phenylene terephthalamide) represented by Formula 1. Due to their good tensile strengths, the binders according to embodiments of the present invention can maintain the conductive path of the electrode (even during expansion or shrinkage of the active materials) without losing intrinsic properties, thereby improving the cycle life of the rechargeable battery.

Manufacture of Rechargeable Battery

Figure 2:
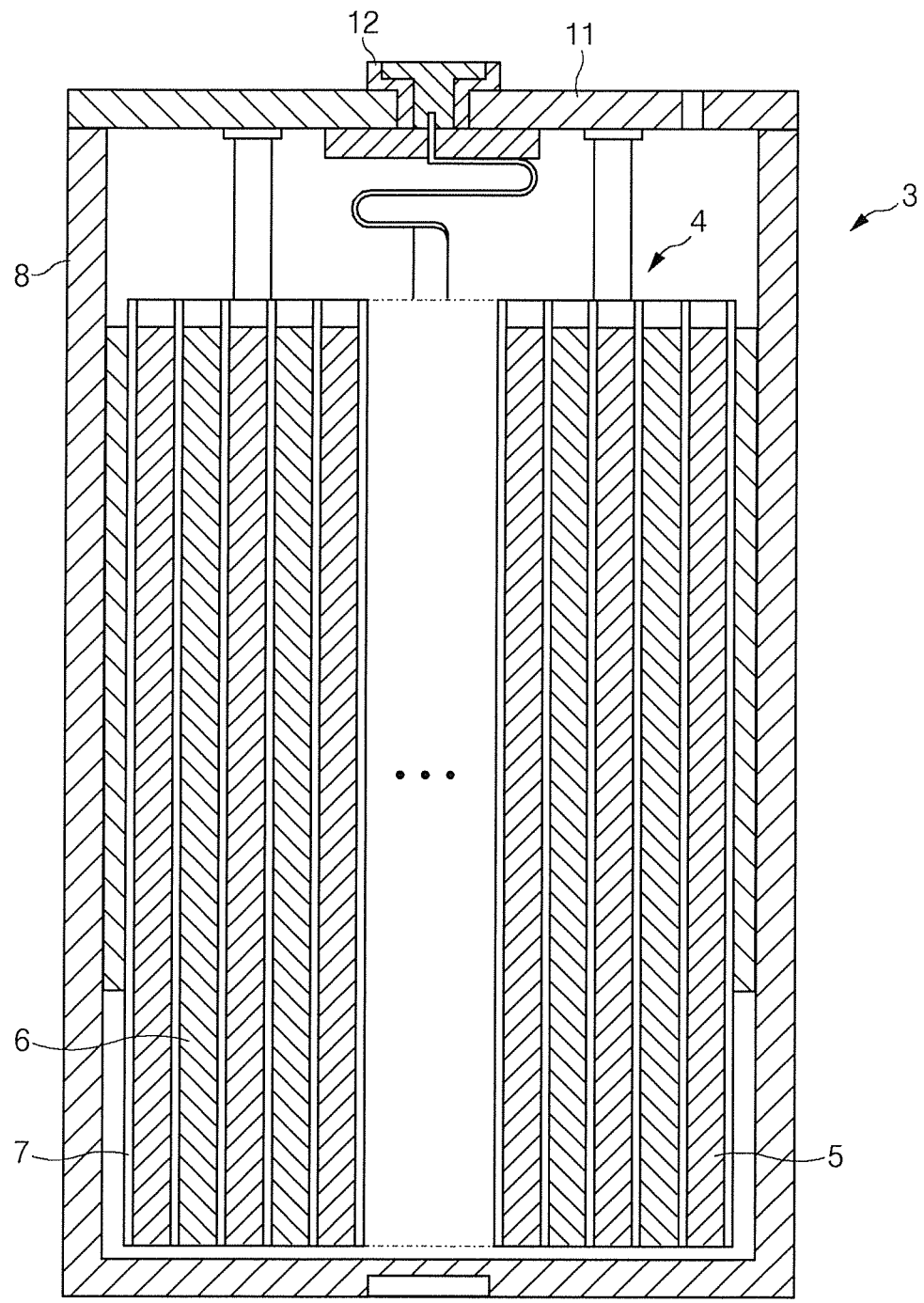
FIG. 2 is a cross-sectional view of a lithium rechargeable battery according to an embodiment of the present invention.

In some embodiments of the present invention, a rechargeable battery includes the electrode as a positive electrode and/or a negative electrode, for example a negative electrode. As shown in FIG. 2, the lithium battery 3 includes an electrode assembly 4 including a cathode 5, anode 6 and a separator 7 positioned between the cathode 5 and anode 6. The electrode assembly 4 is housed in a battery case 8, and sealed with a cap plate 11 and sealing gasket 12. An electrolyte is then injected into the battery case to complete the battery.

Separator

The separator is disposed between the positive electrode and the negative electrode. As the separator, an insulating thin film having good ion permeability and mechanical strength may be used.

The separator typically has a pore diameter of 0.01 to 10 μm and a thickness of 5 to 100 μm.

As the separator, a sheet or non-woven fabric made of an olefin polymer such as polypropylene and/or a glass fiber or polyethylene (which have chemical resistance and hydrophobicity) may be used.

When a solid electrolyte such as a polymer is employed as the electrolyte, the solid electrolyte may serve as both the separator and the electrolyte.

Specific examples of the olefin polymer used as the separator may include polyethylene, polypropylene, polytetrafluoroethylene (PTFE), multi-layered structures having two or more layers of these materials, composite multi-layered structures such as polyethylene/polypropylene two layered separators, polyethylene/polypropylene/polyethylene three layered separators, or polypropylene/polyethylene/polypropylene three layered separators.

Lithium Salt-Containing Non-Aqueous Electrolyte

The lithium salt-containing non-aqueous electrolyte includes a non-aqueous electrolyte and a lithium salt. As the non-aqueous electrolyte, a non-aqueous organic solvent, an organic solid electrolyte or an inorganic solid electrolyte may be used.

Nonlimiting examples of the non-aqueous organic solvent include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Nonlimiting examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Nonlimiting examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte. Nonlimitnig examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve the charge/discharge characteristics and flame retardancy, as additive may be further added to the electrolyte. Nonlimiting examples of such additive include pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidone, ethylene glycol dialkyl ether, ammonium salts, pyrrole, 2-methoxy ethanol, aluminum trichloride or the like. If desired, in order to curb combustibility, the non-aqueous electrolyte may further include halogen-containing solvents such as carbon tetrachloride or ethylene trifluoride. Further, in order to improve high-temperature storage characteristics, the non-aqueous electrolyte may additionally include carbon dioxide gas.

EXAMPLES

The following Examples are presented for illustrative purposes only, and do not limit the scope of the present invention.

Preparation of Main Binder: Preparation of Substituted poly(p-phenylene terephthalamide)

Preparation Example 1

0.81 g (7.5 mmol) of 1,4-diaminobenzene, 7.99 g (42.5 mmol) of 2,5-diaminobenzenesulfonic acid, 30 ml of pyridine, 20 g of calcium chloride and 500 ml of N-methylpyrrolidone as a solvent were added to a dried reaction vessel (while purging with nitrogen ($N_2$) gas) and dissolved while stirring at 70° C. for 2 hours. The reaction vessel was maintained at a temperature of 0° C. using a water/ice bath.

10.15 g (50 mmol) of 1,4-benzenedicarbonyl dichloride was slowly poured into the reaction vessel, the mixture was stirred for one hour, and then the water/ice bath was removed, thereby maintaining the reaction vessel at room temperature. Then, the reactant was stirred for one more hour to produce a liquid crystalline reaction product.

The produced reactant was slowly poured into a container including a 1% chloric acid solution maintained at 0° C. using a water/ice bath while stirring, thereby preparing a precipitate which was then intensely mixed for a further one hour.

The precipitate was subjected to filtering, washing with 1% chloric acid solution and pure water, followed by drying in a vacuum oven maintained at 90° C. for 3 hours.

5 g of the dried product and 95 g of 0.05M $NH_4OH$ solution were added to a sealed vessel and shaken at 70° C. for one hour, thereby preparing an aqueous solution of the binder of Formula 5 with 5% solid.

As the result of light scattering analysis performed on the dried product, the weight average molecular weight of the binder of Formula 5 was 11,200 g/mol (MWD=1.4).

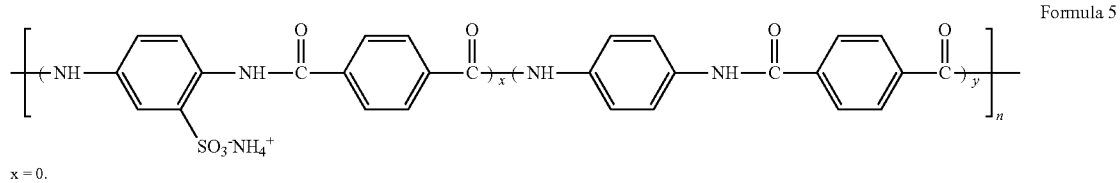

Formula 5 x = 0.

The binder of Formula 5 was analyzed by thermogravimetric analysis (TGA) and the result thereof is shown in FIG. 1. FIG. 1 shows that the remaining moisture was removed up to 165° C., a desulfonication reaction began at 314° C. and completed at 394° C. In FIG. 1, the abscissa (i.e., x-axis) indicates temperature and the ordinate (i.e., y-axis) indicates the amount of pyrolyzed binder in percent by weight (wt %) based on the total weight of binder at the start of the heat treatment.

Preparation Example 2

3.24 g (30 mmol) of 1,4-diaminobenzene, 30 ml of pyridine, 2.7 g of lithium chloride and 200 ml of N-methylpyrrolidone as a solvent were added to a dried reaction vessel (while purging with nitrogen ($N_2$) gas) and stirred at 70° C. for 2 hours to dissolve.

Thereafter, a solution obtained by dissolving 7.39 g (30 mmol) of 2-sulfoterephthalic acid in 100 g of NMP was injected into the reaction vessel using a dropping funnel while stirring.

Next, the reaction vessel was heated to cause an agitation reaction at 120° C. for 3 hours to produce a liquid crystalline reaction product.

The produced reactant was slowly poured into a container including a 1% chloric acid solution maintained at 0° C. using a water/ice bath while stirring, thereby preparing a precipitate which was then intensely mixed for a further one hour.

The precipitate was subjected to filtering, washing with 1% chloric acid solution and pure water, followed by drying in a vacuum oven maintained at 90° C. for 3 hours.

5 g of the dried product and 95 g of a 0.05M NH₄OH solution were added to a sealed vessel and shaken at 70° C. for one hour, thereby preparing an aqueous solution of the binder of Formula 6 with 5% solid.

Formula 6

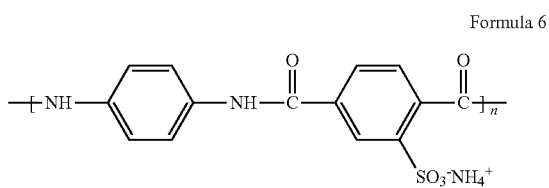

As the result of light scattering analysis performed on the dried product, the weight average molecular weight of the binder of Formula 6 was 9,600 g/mol (MWD=1.4).

The binder of Formula 6 was analyzed by thermogravimetric analysis (TGA). As shown from the TGA result, desulfonication began at 290° C. and completed at 370° C.

Preparation Example 3

5.64 g (30 mmol) of 2,5-diaminobenzenesulfonic acid, 30 ml of pyridine, 2.7 g of lithium chloride and 200 ml of N-methylpyrrolidone as a solvent were added to a dried reaction vessel (while purging with nitrogen (N₂) gas) and stirred at 70° C. for 2 hours to dissolve.

Thereafter, the reaction vessel was maintained at a temperature of −25° C. using a dry ice bath and stirred while adding 17 ml of chlorotrimethylsilane using a dropping funnel over 30 minutes.

The dry ice bath was removed and the reaction vessel was stirred for a further one hour to complete silylation.

Thereafter, a solution obtained by dissolving 7.39 g (30 mmol) of 2-sulfoterephthalic acid in 100 g of NMP was injected into the reaction vessel using a dropping funnel while stirring.

Next, the reaction vessel was heated to cause an agitation reaction at 120° C. for 3 hours to produce a liquid crystalline reaction product.

The produced reactant was slowly poured into a container including a 1% chloric acid solution maintained at 0° C. using a water/ice bath while stirring, thereby preparing a precipitate. Then, the precipitate was intensely mixed for a further one hour.

Then, the precipitate was subjected to filtering, washing with 1% chloric acid solution and pure water, followed by drying in a vacuum oven maintained at 90° C. for 3 hours.

5 g of the dried product and 95 g of pure water were added to a sealed vessel and shaken at 70° C. for one hour, thereby preparing an aqueous solution of the binder of Formula 7 with 5% solid.

Formula 7

$$\text{--}\!\!\left[\text{NH}\!-\!\!\!\bigcirc\!\!\!-\!\!\text{NH}\!-\!\overset{\overset{\displaystyle O}{\|}}{C}\!-\!\!\!\bigcirc\!\!\!-\!\overset{\overset{\displaystyle O}{\|}}{C}\right]_n$$

with SO₃H groups on the rings

As the result of light scattering analysis performed on the dried product, the weight average molecular weight of the binder of Formula 6 was 27,400 g/mol (MWD=1.6).

The binder of Formula 6 was analyzed by thermogravimetric analysis (TGA). As shown from the TGA result, desulfonication began at 270° C. and completed at 350° C.

Preparation of Subsidiary Binder: Preparation of polyamic acid aqueous solution

Preparation Example 4

8.1 g (25 mmol) of 3,3',4,4'-benzophenone tetracarboxylic dianhydride (BTDA) and 74.2 g of purified NMP were added to a dried reaction vessel and stirred at room temperature under a nitrogen stream to dissolve, followed by injection of 5.0 g (25 mmol) of 4,4'-oxydianiline (ODA).

Thereafter, the reactant was stirred at room temperature for 12 hours to prepare poly(amic acid) dissolved in NMP. As a result of gel permeation chromatography (GPC) analysis, the weight average molecular weight of the prepared poly(amic acid) solution was determined to be 180,000 g/mol, and the pyrolysis reaction was determined to begin at 550° C.

1 L of petroleum ether was added to a 2 L-flask with a stirrer and 50 g of the poly(amic acid) solution dissolved in NMP was slowly poured into the flask while stirring to form a precipitate.

Thereafter, the precipitate resulting from filtering and washing was dried in a vacuum oven at 60° C. for 3 hours, yielding a powder.

5 g of the dried powder and 45 g of 0.05M NH₄OH solution were added to a sealed vessel and shaken at 70° C. for one hour, thereby preparing a poly(amic acid) aqueous solution with 10% solid.

Preparation of Electrode Active Material Slurry

Example 1

A negative electrode slurry was prepared in a slurry preparation container using a mixture including 24.0 g of the aqueous solution with 5% solid prepared in Preparation Example 1, 12 g of Si-alloy as a negative active material, 5 g of graphite and 1 g of ketjen black as a conductive agent.

A small amount of water was added to the reaction material to adjust the viscosity of the slurry during slurry preparation.

Example 2

A negative electrode slurry was prepared as in Example 1, except that 12.0 g of the aqueous solution with 5% solid prepared in Preparation Example 1 and 5.0 g of the poly(amic acid) with 10% solid prepared in Preparation Example 4 were used instead of the 24.0 g of the aqueous solution with 5% solid prepared in Preparation Example 1.

Example 3

A negative electrode slurry was prepared as in Example 1, except that 13.0 g of the aqueous solution with 5% solid prepared in Preparation Example 2 and 5.0 g of the poly(amic acid) with 10% solid prepared in Preparation Example 4 were used instead of the 24.0 g of the aqueous solution with 5% solid prepared in Preparation Example 1.

Example 4

A negative electrode slurry was prepared as in Example 1, except that 16.0 g of the aqueous solution with 5% solid prepared in Preparation Example 3 and 5.0 g of the poly(amic acid) with 10% solid prepared in Preparation Example 4 were used instead of the 24.0 g of the aqueous solution with 5% solid prepared in Preparation Example 1.

Example 5

A negative electrode slurry was prepared as in Example 1, except that 0.96 g of the aqueous solution with 5% solid prepared in Preparation Example 1 and 9.6 g of the poly(amic acid) with 10% solid prepared in Preparation Example 4 were used instead of the 24.0 g of the aqueous solution with 5% solid prepared in Preparation Example 1.

Comparative Example 1

A negative electrode slurry was prepared as in Example 1, except that 10.0 g of the poly(amic acid) with 10% solid prepared in Preparation Example 4 was used alone, instead of the 24.0 g of the aqueous solution with 5% solid prepared in Preparation Example 1.

Manufacture of Electrodes and Batteries

Each of the negative electrode slurries prepared in Examples 1 to 5 and Comparative Example 1 was coated on a copper foil, primarily dried at 110° C. for 30 minutes, subjected to punching, pressing and welding to manufacture a coin cell, and vacuum dried in a vacuum oven at a temperature of 400° C. for one hour, thereby manufacturing a negative electrode.

Each of the manufactured negative electrodes for a rechargeable battery were used with Li metal as a counter electrode and a porous polypropylene film as a separator to manufacture half cells for a lithium rechargeable battery. Here, a mixed solution of ethylene carbonate and diethylene carbonate (1:1 by volume) having 1M $LiPF_6$ dissolved therein was used as the electrolyte. Cell assembly was performed in a glove box filled with argon gas, and the battery characteristics were evaluated using a charge/discharge device for 100 mA.

Experimental Example 1

Evaluation of Battery Characteristics

In order to evaluate initial formation efficiency, the manufactured cells were charged and discharged at room temperature (25° C.) at 0.2 C. In order to evaluate discharge capacity, the manufactured cells were charged and discharged at 0.5 C. In order to evaluate discharge retention, the test cells were charged at 0.5 C and discharged at 1.0 C. The test cells were fully charged at a constant current with a cutoff voltage of 0.5 V, and were discharged with a constant current to reach a voltage of 1.5 V. 50 charge and discharge cycles were performed to evaluate the charge/discharge cycle characteristics. In order to evaluate the battery characteristics more accurately, 4 test cells with the same conditions were evaluated at the same time for each Example, and the results are shown in Table 1 below, in which average values for the 4 cells are listed.

TABLE 1

| Slurry | Initial Formation Efficiency (%) | Discharge Capacity @ 50 cycles (mAh/cc) | Discharge Capacity Retention Rate @ 50 cycles (%) |
| --- | --- | --- | --- |
| Example 1 | 95 | 1041 | 75 |
| Example 2 | 92 | 1170 | 87 |
| Example 3 | 92 | 1120 | 83 |
| Example 4 | 91 | 1040 | 78 |
| Example 5 | 88 | 915 | 71 |
| Comparative Example 1 | 87 | 880 | 69 |

As shown in Table 1, the electrodes manufactured using the binder compositions prepared in Examples 1 to 5 had superior initial formation efficiency than the electrode manufactured using the slurry prepared in Comparative Example 1. This is presumably due to a capacity difference. That is to say, compared to the electrode manufactured using the slurry prepared in Comparative Example 1, the electrodes manufactured using the binder compositions prepared in Examples 1 to 5 have a lower number of Li ions consumed by the irreversible reaction between Li ions and imide groups in the binder.

In addition, the electrodes manufactured using the binder compositions prepared in Examples 1 to 5 had superior discharge capacity retention ratios than the electrode manufactured using the slurry prepared in Comparative Example 1. This is presumably because the binder composition of Formula 1 according to embodiments of the present invention has higher tensile strength than polyimide, suggesting that the electrodes manufactured using the binder compositions prepared in Examples 1 to 5 have higher endurance against expansion or shrinkage of the active material during charging and discharging, as compared to the electrode manufactured using the slurry prepared in Comparative Example 1.

In addition, in comparing Example 1 (having only the binder of Formula 1) with Comparative Example 1, it is seen that the electrode prepared in Example 1 demonstrated a superior initial formation efficiency and discharge capacity retention ratio. However, since a subsidiary binder (such as polyimide) is not used in Example 1, the discharge capacity retention ratio of the electrode prepared in Example 1 was slightly lowered, which is presumably because the binder according to embodiments of the present invention had weaker adhesion between the active material and the current collector, and lower dispersibility of the conductive agent than polyimide.

In Example 5 (in which a small amount of the binder of Formula 1 was used), the battery characteristics were slightly improved as compared to Comparative Example 1, but the improvement was not as high as desired.

Although certain embodiments of the present invention have been illustrated and described, it will be understood by those of ordinary skill in the art that various modifications and changes may be made to the described embodiments without departing from the spirit or scope of the present invention, as defined in the appended claims, and their equivalents.

What is claimed is:

1. A binder composition for a rechargeable battery, comprising a main binder comprising a poly(p-phenylene terephthalamide) having at least one substituent selected from sulfonic acid groups ($-SO_3H$) or sulfonate groups ($-SO_3^-M^+$) in a polymer main chain, a total amount of the at least one substituent being less than 10 wt % of the main binder.

2. The binder composition of claim 1, wherein at least one of the at least one substituents is directly attached to an aromatic ring of the poly(p-phenylene terephthalamide).

3. The binder composition of claim 1, further comprising a subsidiary binder different from the main binder, wherein the subsidiary binder is not decomposed at a temperature of 450° C. or less.

4. The binder composition of claim 3, wherein the subsidiary binder includes at least one polymer selected from the group consisting of poly(aryl ether ketones), poly(aryl amides), aromatic polyamic acids, aromatic polyimides, aromatic poly(amide-imides), aromatic polyurethanes, aromatic polyesters, polybenzimidazoles, polybenzoxazoles, polybenzothiazoles, aromatic polysulfones, aromatic poly(ether sulfones), aromatic poly(phenylene sulfides), aromatic polyphosphazenes, and derivatives thereof wherein the derivatives are selected from the group consisting of polymers substituted with fluoride, polymers having a sulfone group ($-SO_2-$) in a main chain, or block copolymers of different polymers.

5. The binder composition of claim 3, wherein the main binder is present in an amount of at least 5 wt % based on the total weight of the binder.

6. The binder composition of claim 1, further comprising at least one additive selected from the group consisting of dispersants, thickeners, conductive agents and fillers.

7. The binder composition of claim 6, wherein the additive is present in an amount of 0.1 to 10 wt % based on the total weight of the binder composition exclusive of solvent.

8. The binder composition of claim 6, wherein the dispersant includes a hydrocarbon having 5 to 20 carbon atoms in its lipophilic part, an acryl oligomer, an ethylene oxide oligomer, a propylene oxide oligomer, an ethylene oxide and propylene oxide oligomer, or a urethane oligomer.

9. The binder composition of claim 6, wherein the thickener includes at least one selected from carboxymethyl cellulose, carboxyethyl cellulose, ethyl cellulose, hydroxymethyl cellulose, hydroxyethyl cellulose, hydroxypropyl cellulose, or polyvinyl alcohol.

10. An electrode for a rechargeable battery, comprising an electrode current collector, an electrode active material and a binder, wherein the binder includes a main binder comprising poly(p-phenylene terephthalamide) having at least one substituent selected from sulfonic acid groups ($-SO_3H$) or sulfonate groups ($-SO_3^-M^+$) in a main chain, and a total amount of the at least one substituent is less than 10 wt % of the main binder.

11. The electrode of claim 10, wherein the electrode is a negative electrode.

12. A rechargeable battery comprising:
a positive electrode;
a negative electrode comprising the electrode of claim 10; and
an electrolyte.

* * * * *